United States Patent
Gaffney et al.

(10) Patent No.: US 9,081,471 B2
(45) Date of Patent: Jul. 14, 2015

(54) PROVIDING MODAL WINDOW VIEWS FOR WIDGETS ON WEB PAGES

(75) Inventors: Eamon Gaffney, San Francisco, CA (US); Rene Garcia-Oineza, Las Cruces, NM (US)

(73) Assignee: Oracle International Corporation, Redwood Shores, CA (US)

( * ) Notice: Subject to any disclaimer, the term of this patent is extended or adjusted under 35 U.S.C. 154(b) by 1048 days.

(21) Appl. No.: 12/233,927

(22) Filed: Sep. 19, 2008

(65) Prior Publication Data

US 2010/0077344 A1    Mar. 25, 2010

(51) Int. Cl.
*G06F 3/048* (2013.01)
*G06F 3/0481* (2013.01)

(52) U.S. Cl.
CPC .................. *G06F 3/0481* (2013.01)

(58) Field of Classification Search
CPC   G06F 3/0481; G06F 17/246; G06F 17/30554
USPC .................................. 715/788, 764
See application file for complete search history.

(56) References Cited

U.S. PATENT DOCUMENTS

| | | | | |
|---|---|---|---|---|
| 5,414,810 A * | 5/1995 | Doyle et al. | ................. | 715/804 |
| 5,581,686 A * | 12/1996 | Koppolu et al. | ............ | 715/784 |
| 5,596,702 A * | 1/1997 | Stucka et al. | ................. | 715/746 |
| 5,893,123 A * | 4/1999 | Tuinenga | ...................... | 715/209 |
| 6,188,401 B1 * | 2/2001 | Peyer | ........................... | 715/805 |
| 6,523,022 B1 * | 2/2003 | Hobbs | ................................. | 1/1 |
| 6,632,249 B2 * | 10/2003 | Pollock | .......................... | 715/207 |
| 6,988,241 B1 * | 1/2006 | Guttman et al. | ............... | 715/220 |
| 7,328,435 B2 * | 2/2008 | Trifon | ............................ | 717/171 |
| 7,761,800 B2 * | 7/2010 | Chaudhri et al. | ............. | 715/764 |
| 7,949,963 B1 * | 5/2011 | Pham et al. | ..................... | 715/851 |
| 2003/0011639 A1 * | 1/2003 | Webb | ............................. | 345/808 |
| 2003/0154261 A1 * | 8/2003 | Doyle et al. | .................. | 709/218 |
| 2003/0164862 A1 * | 9/2003 | Cadiz et al. | .................... | 345/838 |
| 2003/0227489 A1 * | 12/2003 | Arend et al. | ................... | 345/804 |
| 2006/0173862 A1 | 8/2006 | Sauermann | | |
| 2006/0277460 A1 * | 12/2006 | Forstall et al. | ................. | 715/513 |
| 2007/0245241 A1 | 10/2007 | Bertram et al. | | |
| 2008/0141168 A1 | 6/2008 | Ryan et al. | | |
| 2008/0163081 A1 * | 7/2008 | Gillette et al. | ................ | 715/762 |

OTHER PUBLICATIONS

"Suitable." The American Heritage® Dictionary of the English Language. Boston: Houghton Mifflin, 2007. Credo Reference. Web. Aug. 5, 2011.*

(Continued)

*Primary Examiner* — Steven B Theriault
*Assistant Examiner* — Amy M Levy
(74) *Attorney, Agent, or Firm* — Kilpatrick Townsend & Stockton LLP

(57) ABSTRACT

Popup modal windows are provided that allow for expanded views of information corresponding to a widget displayed on a page through an interface. Such a widget can include a grid, long edit box, spreadsheet, or any other such element, such that the widget has a viewable extent larger than can be displayed on a region of the page corresponding to the widget. A user opens a modal window for a widget and resizes and/or move the modal window in order to alter the viewable extent of the widget which is displayed. Edits can be accepted into the widget via the modal window and then be reflected in the view of the widget on the page after the modal window is closed.

14 Claims, 7 Drawing Sheets

(56) References Cited

OTHER PUBLICATIONS

Goodman, Danny. JavaScript and DHTML Cookbook™, Second Edition. © 2007, 2003. O'Reilly Media, Inc. [accessed] safaribooksonline.com [on] Jun. 25, 2013.*

Infragistics Forums. Modal Row Template. Nov. 20, 2007 to Nov. 3, 2008 [accessed] infragistics.com/community.forums/t/672.aspx [on] Jun. 25, 2013.*

Developer Express. ASP.NET Popup Edit Form Editing Apr. 11, 2008 [accessed] demos.devexpress.com/ASPxGridViewDemos [via] Internet Archive [on] Jun. 25, 2013.*

Oracle Community. Open a Pop Up Modal Window Process Form Request Method. Question posted Jul. 8, 2007, Responses posted Sep. 8-10, 2007. [accessed] https://community .oracle.com/thread/530977 [on] Mar. 17, 2014.*

"Edit Table Data" url: http:///www.minq.se/products/dbvis/doc/main/doc/ug/editData/editData.html, pp. 1-23.

"Displaying Extended Details in a GridView Using an Ajax Pop-Up," url: http://aspnet.4guysfromrolla.com/articles/070407-1.aspx, pp. 1-20.

"Using Modal popup edit form for updating multiple rows," url: http://community.devexpress.com/forums/t/64768.aspx, pp. 1-3.

"FCKeditor," url: http://www.fckeditor.net/demo, pp. 1-2.

* cited by examiner

PROVIDING MODAL WINDOW VIEWS FOR WIDGETS ON WEB PAGES

BACKGROUND OF THE INVENTION

A web browser or browser interface is a software application which typically displays a graphical user interface. Popular Web browsers include Firefox, Safari, and Internet Explorer. Web browsers can be run on computers, internet appliances, mobile devices such as cellular phones, and other machines.

A browser on a computer system can connect to a server or other computer so that data on the server such as text, pictures, videos, or interactive multimedia can be viewed by a user. Web browsers can connect to websites on the Internet, a smaller local area network connected to the Internet, or a private network unconnected to the Internet.

A user of a browser typically refers to a human being who views and interacts with a predefined browser software application on a machine. The browser software application is typically compiled into machine-readable instructions. On some platforms, a user can open multiple "instances" of a browser and multitask with other applications besides the browser interface.

A web browser typically is displayed in a rectangular window on a display screen. The web browser can have buttons and other on-screen controls that a user can manipulate. Typical controls include functions to go back and forth through a history of visited web pages, stop loading or refresh a web page, or go to a home page. Other controls include a textbox for entering an Internet Protocol (IP) address or web address in which to browse or visit next.

Each web browser has a client area in which a web page is displayed. The client area is typically rectangular and takes up a majority of the web browser window. Web pages, commonly coded in HyperText Markup Language (HTML) and sometimes coded with scripting languages such as JavaScript or VBScript, can often display a wide variety of text, images, video, audio, and other multimedia, as well as form implements such as buttons, textboxes, and other elements.

A web browser window can sometimes be resized or moved by a user around a computer display screen, sometimes called a desktop or workspace. By resizing and/or moving a browser and other windows, a user can read, edit, and otherwise interact with several applications at once. When a user moves a browser window, a control, text, picture, or other object which is in the client area of the browser window moves with the window. When a user resizes a browser window, objects can stay put, rearrange, stretch, or resize themselves with the window. Elements are conventionally "confined" to the client area. That is, no portion of the object is displayed outside of the client area.

Web browsers are often used as interfaces for enterprise software because, among other advantages, browsers are widespread, are readily available on a wide range of computing devices, and users are often familiar with browser interfaces. Enterprise software is software that is directed toward one or more aspects of running a business or similar enterprise, such as administrating employee payroll, tracking assets, accounting, and managing vendors and merchants. Enterprise software for a major business can include several different software applications which access a variety of databases. Sometimes written using proprietary architectures, enterprise software can be hosted on servers which are geographically remote but connected to users through a network.

User interactivity of enterprise software applications, including ease of use and intuitiveness, has been a goal of some enterprise software application releases. For example, many application pages contain grids in some form or another. These grids can be placed into a main area of the page, a frame of the page, as part of a widget placed on the page, or in any other appropriate location in or relative to such a page. These grids can grow in length and/or width depending on the number and size of rows and/or columns of data they contain. When placed onto a web page, the length of the grid can cause the overall page length to increase. When the length of a page is larger than what can be displayed in the client area of a browser window, the browser often displays scrollbars, arrows, continuation prompts, or other scrolling controls so that a user may scroll down to see the rest of the grid on the page. These scrolling controls take up screen real estate, add clutter to the screen, and are sometimes unintuitive to beginning users.

A scrollbar can be placed within the grid itself so that the rest of the client area of the browser will not lose space to scrollbars. This allows rows to be added to the grid without affecting the overall page length. However, the above problems can still exist because space is still being used for scrollbars.

To show more information without adding to the footprint of a grid, some enterprise application web pages use the concept of a 'tooltip,' a small, read-only popup window that appears when a cursor hovers over an element. Other web pages use the concept of a small popup window to show static information related to the grid. These popup windows have been known to display thumbnail images or previews of pages that users will see if they click on the links, or provide some additional links or images.

BRIEF SUMMARY OF THE INVENTION

Embodiments in accordance with the present disclosure relate to providing a modal window view of information, such as data in a grid, corresponding to a widget on a web page. In one embodiment, a user begins by clicking, hovering over, or otherwise selecting a widget on a page. A resizable modal window is displayed within the same browser window but overlying at least a portion of the page, and a copy of information from the widget is displayed in the modal window. The user can move and resize the modal window within the client area of the browser window so that more of the viewable extent of the widget is exposed. If the user edits the exposed widget via the modal window, the user can close the modal window, and the edits are updated into the widget on the page.

One embodiment relates to a method of providing an expanded view of information for a widget in a page to be displayed in a user interface. The method includes providing for displaying a page containing at least one widget, the page displaying a first view of information for the widget when the page is displayed in a user interface window. The method also includes opening a modal window in the user interface window in response to receiving a request from a user, the modal window displaying a second view of the information for the widget, the modal window being confined to a viewable region of the user interface window and overlying at least a portion of the page displayed in the user interface window. The method also includes enabling a user to adjust at least one of a size, position, and view of the modal window within the viewable region of the user interface window, such that the modal window is able to display different portions of the information for the widget in the second view, and enabling a user to edit the information for the widget when the information is displayed in the modal window, the edited information being subsequently displayed in the first view of the widget.

Another embodiment relates to a computer program product including program instructions embodied on a tangible computer-readable medium for providing an expanded view of information for a widget in a page to be displayed in a user interface. The product includes instructions for providing for displaying a page containing at least one widget, the page displaying a first view of information for the widget when the page is displayed in a user interface window. The product also includes instructions for opening a modal window in the user interface window in response to receiving a request from a user, the modal window displaying a second view of the information for the widget, the modal window being confined to a viewable region of the user interface window and overlying at least a portion of the page displayed in the user interface window. The product also includes enabling a user to adjust at least one of a size, position, and view of the modal window within the viewable region of the user interface window, such that the modal window is able to display different portions of the information for the widget in the second view, and enabling a user to edit the information for the widget when the information is displayed in the modal window, the edited information being subsequently displayed in the first view of the widget.

Yet another embodiment is a system for providing an expanded view of information for a widget in a page to be displayed in a user interface. The system includes a processor and a memory device including instructions that, when executed by the processor, cause the processor to provide for displaying a page containing at least one widget, the page displaying a first view of information for the widget when the page is displayed in a user interface window, and in response to receiving a request from a user, open a modal window in the user interface window, the modal window displaying a second view of the information for the widget, the modal window being confined to a viewable region of the user interface window and overlying at least a portion of the page displayed in the user interface window, enable a user to adjust at least one of a size, position, and view of the modal window within the viewable region of the user interface window, such that the modal window is able to display different portions of the information for the widget in the second view, and enable a user to edit the information for the widget when the information is displayed in the modal window, the edited information being subsequently displayed in the first view of the widget.

A further understanding of the nature and the advantages of the embodiments disclosed and suggested herein may be realized by reference of the remaining portions of the specification and the attached drawings.

DETAILED DESCRIPTION OF THE INVENTION

Figure 1:
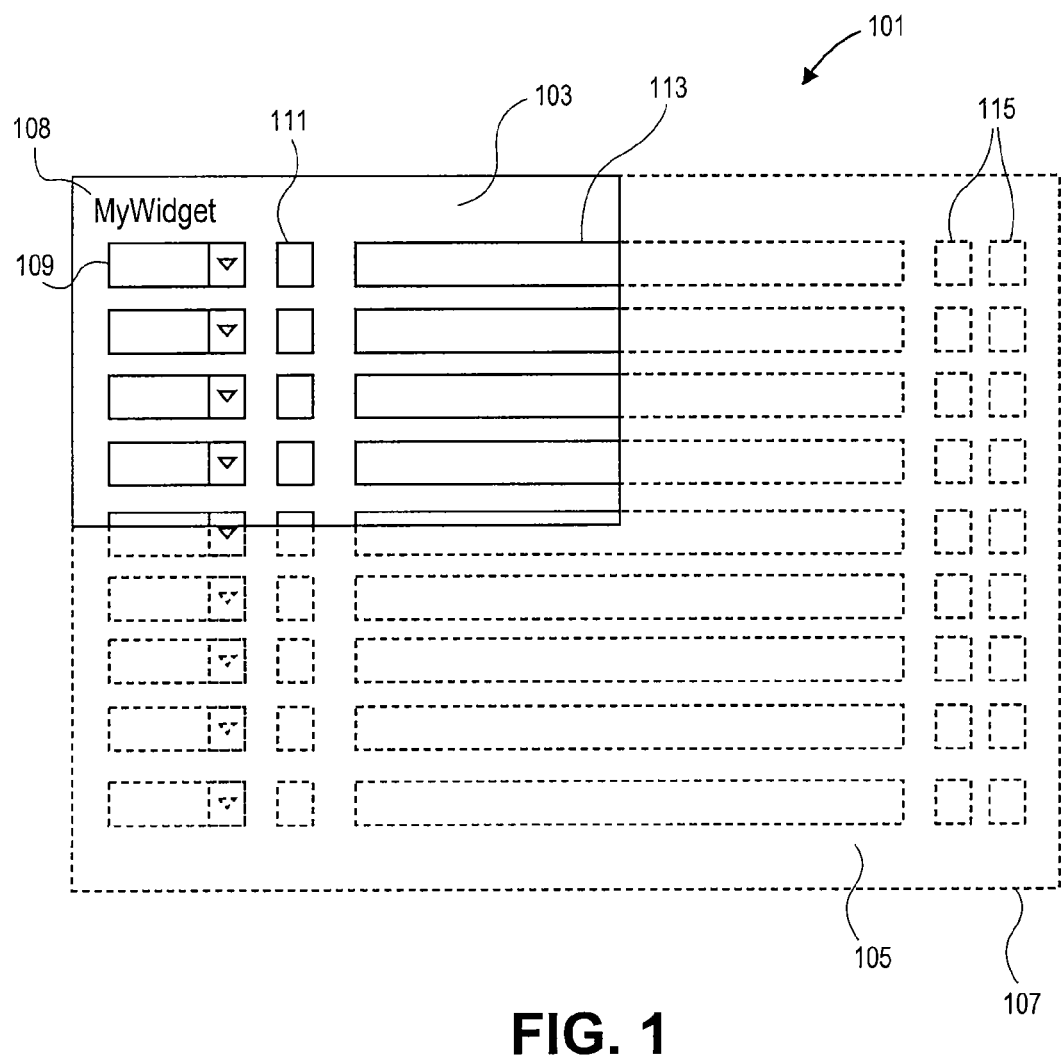
FIG. 1 is an illustration of a partially displayed widget having a displayed extent and an undisplayed extent in accordance with an embodiment of the present invention.

Components such as Enterprise tools, applications, and Web pages commonly include data elements such as grids, tables, or long edit boxes, which often are provided as part of a widget. As used herein, a widget refers to a set of software code or other instructions that can be code that can be executed within a designated portion of a page, typically without requiring additional compilation. The size or footprint of such grids can be somewhat constrained by the 'real estate' or screen space available. The footprint of grids may be designed to be small and compact, but these grids may contain a large number of rows of data. The user may wish to see more of this data. Various embodiments provide an ability for the user to expand out this grid from a display region for the widget on the page into a modal window. This modal window can be resized by the user to show more, fewer, and/or different rows and/or columns of data in the grid. Also, any changes to data in the grid, or the grid itself, via the modal window can update the grid on the main page when the user closes or otherwise leaves the modal window. In some embodiments, a widget on the main page can be updated as the information in the corresponding modal window is updated.

A widget typically has a "viewable extent." A viewable extent of a widget is the uncropped graphical area of the widget. In other terms, the viewable extent of a widget is the minimum height and minimum width that the widget's displayed extent (see below) would need to be such that increasing the height or width would not display additional graphical features. For some widgets, this would be the minimum size above which scrollbars become unnecessary to view all of its graphical features. Widgets are commonly rectangular, but can also be circular or have other closed geometric shapes. Many widgets are shaded so that they appear three-dimensional.

A widget with a viewable extent in some embodiments also can have a "displayed extent" and an "undisplayed extent." A displayed extent of a widget is the viewable extent shown on a display page or screen at a point in time. An undisplayed extent is the viewable extent that is not the displayed extent.

An example of a graphical user interface (GUI) widget is a grid. A grid can have a fixed or variable number of rows and columns shown in the main page as "chunks." For example, a grid with 100 rows may only have the first 10 of its 100 rows shown on the main page. That is, rows 1-10 are in the displayed extent of the grid, while rows 11-100 are in the undisplayed extent. The first 10 rows are a chunk of rows. A user can view the next set of 10 rows by clicking a control on the grid, making rows 11-20 in the displayed extent of the grid while rows 1-10 and 21-100 are in the undisplayed extent. Rows 11-20 are a chunk of rows. Part of the undisplayed extent would be the chunks of rows not displayed. Thus, the undisplayed extent is not confined purely to the dimensions of the widget, but, also to any data that is hidden from view due to chunking. When the modal window is shown, the hidden rows in the grid can be displayed.

FIG. 1 shows widget 101 displaying information using a grid. Widget 101 has a displayed extent 103, which is shown in solid lines, and an undisplayed extent 105, which is shown in dotted lines. The union of both displayed extent 103 and undisplayed extent 105 is viewable extent 107. Widget 101 is a partially displayed widget. A partially displayed widget is one in which its displayed extent is smaller in at least one dimension than its viewable extent.

Widget 101 can have features such as text 108, dropdown combobox 109, active image 111, textbox 113, and buttons 115, but can have other elements such as, but not limited to, radio buttons, listboxes, images, lines and shapes, scrollbars, and slide controls.

Figure 2A:
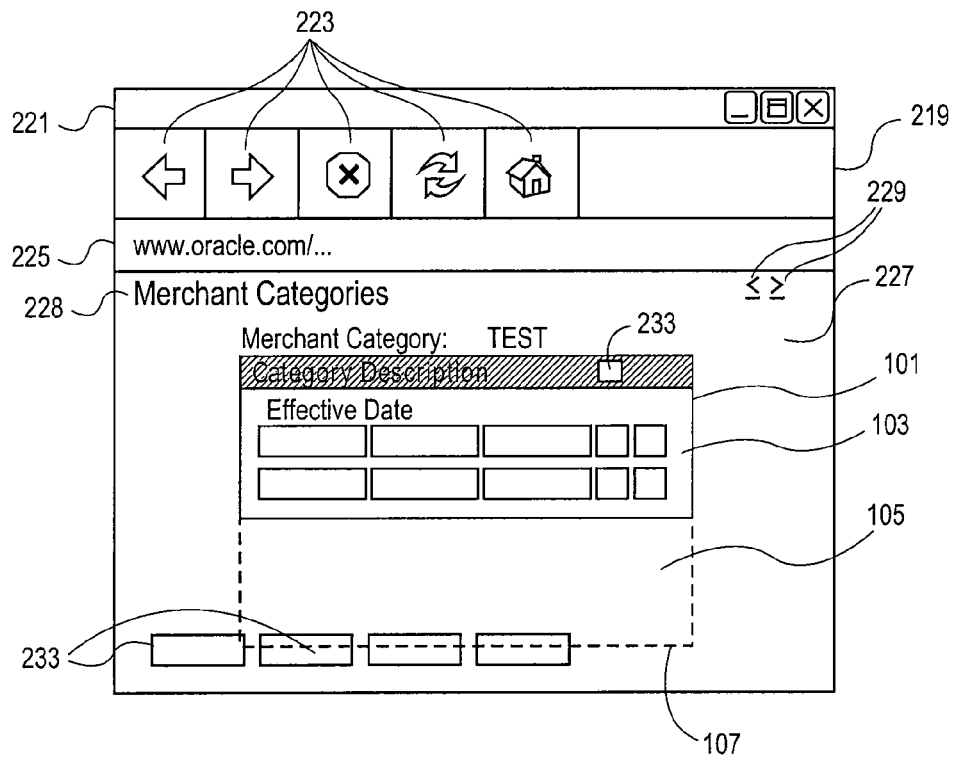
FIG. 2A is an illustration of a partially displayed widget in a web browser window in accordance with an embodiment of the present invention.

FIG. 2A shows partially displayed grid 101 in web browser window 219. While examples will be described with respect to web browsers and internet-based technology, it should be understood that advantages can be obtained using any appropriate user interface in any appropriate electronic environment. Browser window 219 can have title bar 221, navigation buttons 223, address bar 225, and client area 227 where pages are displayed. Typically, client area 227 is rectangular as shown; however, it can be other closed shapes as well. Grid 101 is displayed within client area 227 and has viewable extent 107, displayed extent 103, and undisplayed extent 105. Undisplayed extent 105 is shown in dashed lines and is not displayed in web browser window 219.

Viewable extent 107 as shown is entirely within client area 227; however, a viewable extent can extend far outside the boundaries of a client area. Displayed extent 103 is almost always within the boundaries of client area 227, even if widget 101 is moved. Because displayed extent 103 is almost always within client area 227, widget 101 is said to be "confined" to client area 227, even though viewable extent 107 can extend invisibly outside client area 227.

Besides widget 101, an enterprise application web page in browser window 217 can also have links 229, text 228, buttons 233, and other widgets and elements.

Figure 2B:
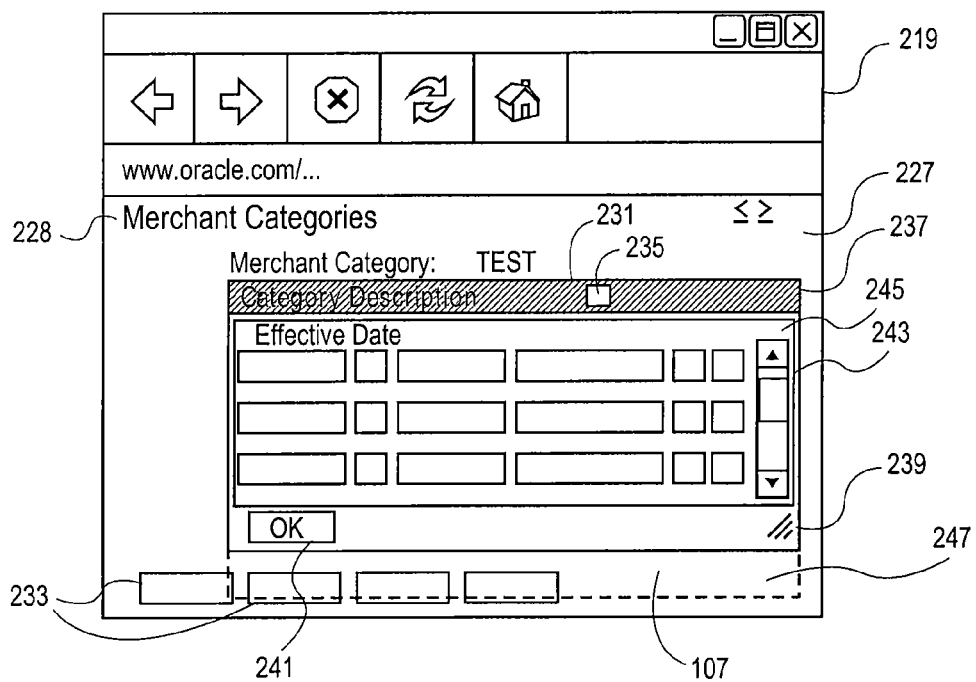
FIG. 2B is an illustration of the widget in FIG. 2A after being popped out into a modal window.

FIG. 2B shows a modal modal window 231 opened as a child window within the browser window 219. Modal window 231 is a child of parent browser window 219 because modal window 231 moves with browser window 219 when browser window 219 is moved. Modal window 231 is confined to browser window 219 because modal window 231 cannot be moved or resized by a user such that its displayed extent is outside client area 227. Modal window 231 floats over other elements on the web page, such as buttons 233.

Modal window 231 can be opened, or initialized and displayed, by a user clicking on expand button 233 shown in FIG. 2A. Modal window 231 can be closed by a user clicking on contract button 235 shown in FIG. 2B. Other opening and closing elements can be used, as well as other user commands besides mouse clicks, such as pressing a keyboard shortcut or using voice activation.

Modal window 231 displays title bar 237, second widget 243, and button 241. Second widget 243 is substantially a copy of widget 101 in that their viewable extents have more or less the same layout, features, and data. The viewable extent of second widget 243 is the same size as viewable extent 107 of widget 101. Second widget 243 as shown takes up most of the real estate of modal window 231 but leaves room for title bar 237 and button 241. Modal window 231 as shown is not quite large enough to show the entire viewable extent of second widget 243. However, displayed extent 245 of second widget 243 in modal window 231 is larger than displayed extent 103 of widget 101 in browser window 219. Conversely, undisplayed extent 247 of second widget 243 in modal window 231 is smaller than undisplayed extent 105 of widget 101 in browser window 219.

Modal window 231 is modal to browser window 219. That is, browser window 219 normally will not accept user interaction, such as edits, movement commands, or resizing, until and unless modal window 231 is closed. Elements on browser window 219 such as text 228 and buttons 233 can be grayed in order to indicate that they are not active. Also, widget 101 in browser window 219 can disappear or be hidden in order to indicate that second widget 243 is active.

Title bar 237 can be grabbed, or clicked and held, by a user and used to drag and move modal window 231. Modal window 231 can be moved within client area 227 of browser window 219, but is confined to client area 227 of browser window 219.

Figure 2C:
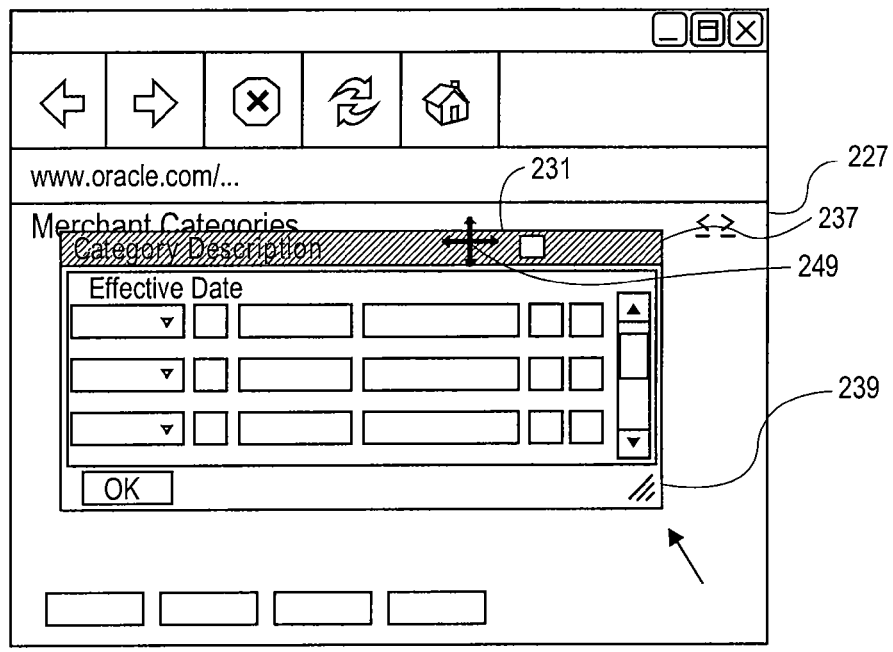
FIG. 2C is an illustration of the modal window in FIG. 2B after being moved by a user.

FIG. 2C shows modal window 231 after having been moved over near the upper left of client area 227. Cursor indicator 249 over title bar 237 indicates that the user is moving or able to move modal window 231.

Modal window 231 can also have its own resize handle 239 which can be grabbed by a user and used to expand or stretch modal window 231. Modal window 231 can be resized within client area 227 of browser window 219, but is confined to client area 227 of browser window 219.

Figure 2D:
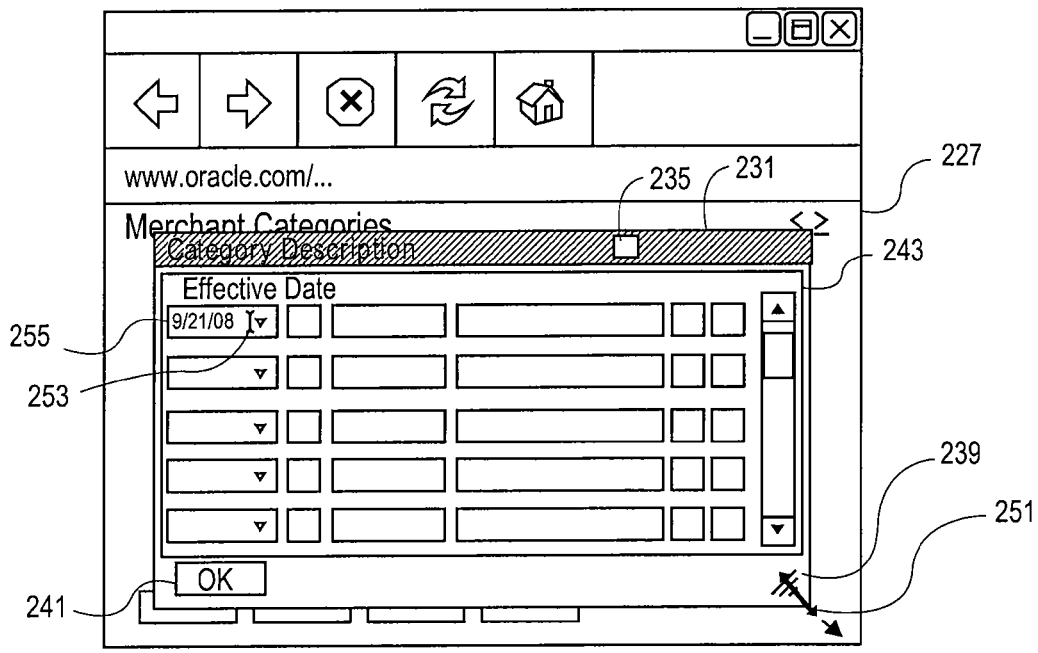
FIG. 2D is an illustration of the modal window in FIG. 2C after being resized by a user.

FIG. 2D shows modal window 231 after having been resized larger. Cursor indicator 251 over resize handle 239 indicates that the user is resizing or able to resize modal window 231. Modal window has been resized to expose all of the viewable extent of second widget 243.

FIG. 2D also shows cell 255 of second widget 243 accepting an edit by a user. Cursor 253 over cell 255 indicates that the user is editing or able to directly edit text within cell 255. Direct editing can include typing text directly into the widget as well as manipulating dials, sliders, buttons, and other controls shown on the widget using a mouse or other input device.

A user clicks contract button 235 to close modal window 231. Modal window 231 can also be closed by a pushbutton 241 in the modal window.

Figure 2E:
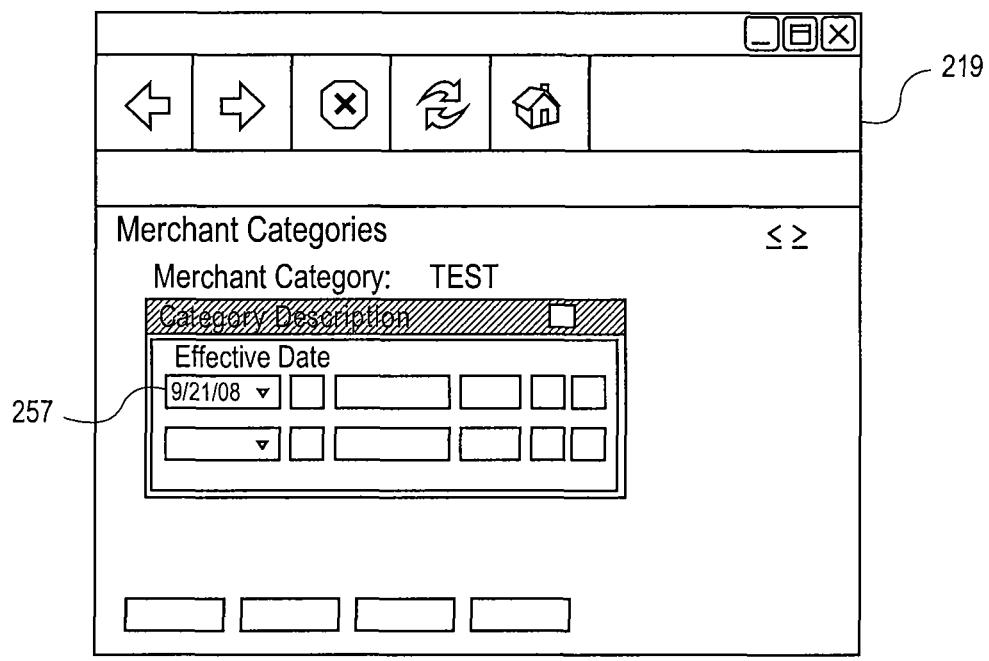
FIG. 2E is an illustration of the partially displayed widget in FIG. 2A after having been updated by an edit to the widget in the modal window in FIG. 2D.

FIG. 2E shows browser window 219 after modal window 231 was closed by a user. Widget 101 has been updated with edit 257 accepted from the user.

While not shown in the figures, it should be understood that a page can contain any appropriate number of widgets in any arrangement. Each of these widgets can have a corresponding modal window that can be activated. In some embodiments, only widgets with different viewable and displayed extents might offer modal functionality. In some embodiments only a single modal window can be opened at any time, while in other embodiments multiple modal windows for multiple widgets can be opened concurrently.

Figure 3:
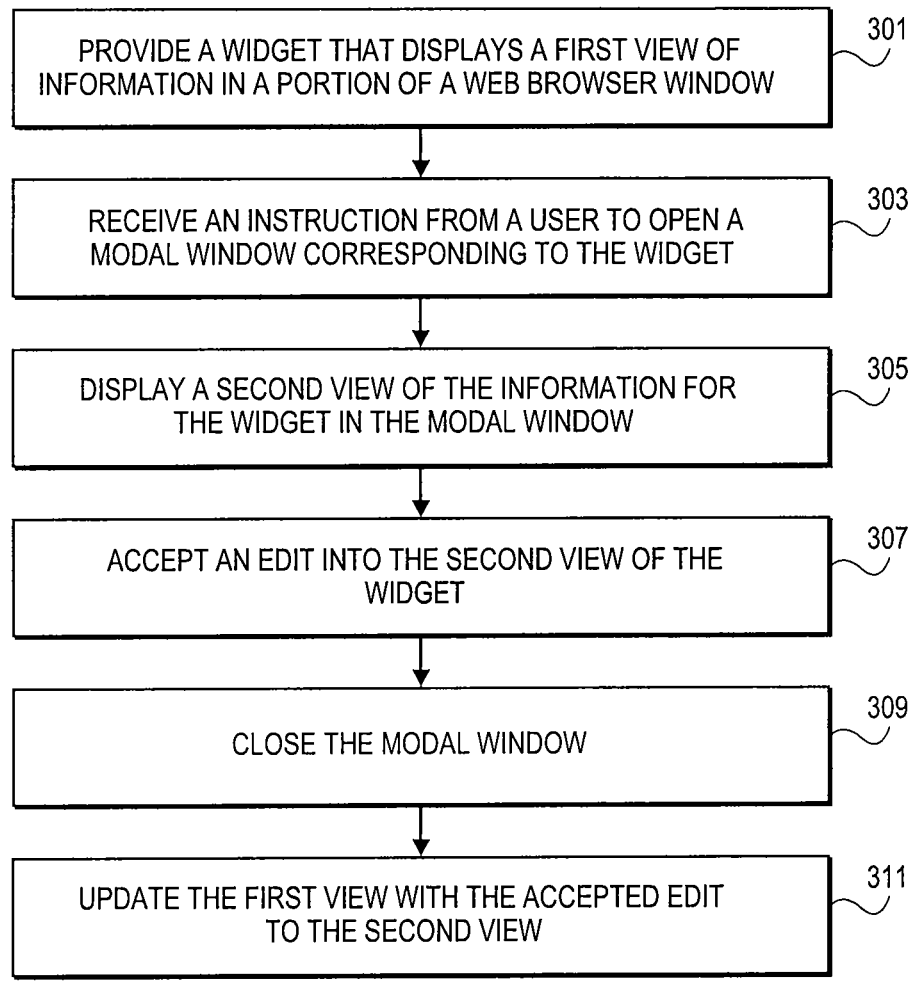
FIG. 3 is a flowchart illustrating an embodiment in accordance with the present invention.

FIG. 3 shows an example flowchart illustrating a process in accordance with one embodiment. In stage 301, a widget is provided that displays a first view of information in a portion of a web browser window. In stage 303, an instruction is received from a user to open a modal window corresponding to the widget. In stage 305, a second view of the information for the widget is displayed in a modal window opened in response to the user selection. The second view in the modal window shows a greater viewable extent than the first view on the Web page. In stage 307, an edit is accepted into the second view. It should be understood, however, that a user may choose not to edit anything relating to the widget. In stage 309, the modal window is closed, either by a user or automatically. In stage 311, if an edit was made, the widget is updated with the accepted edit that was input by the user into the second view in the modal window in stage 309.

An advantage of the exemplary embodiment described above is that such an approach gives control to a user to open a new view of a widget if he or she wishes to see more data within that widget. If the user is not concerned about viewing or editing the data, then the widget can remain small. The widget can be designed so that the widget does not significantly impact the size or length of the page. With small, partially displayed widgets, a web page in an Enterprise application can hold many widgets such as grids and long edit boxes. A user can zoom in on only the widgets about which he or she is concerned.

A system in accordance with one embodiment provides different functionality in a modal view than in the normal view for a widget in a page. For example, a user might only be able to scroll through or edit data in the modal view. A user might also be able to open multiple modal windows and copy or otherwise manipulate data or other elements between the modal windows. If multiple modal windows are open, a user might be able to layer or otherwise place modal windows "on top" of each other in the browser window. Any of a number of other types of functionality can be provided with modal windows as well, as would be apparent to one of ordinary skill in the art in light of the teachings and suggestions contained herein.

Figure 4:
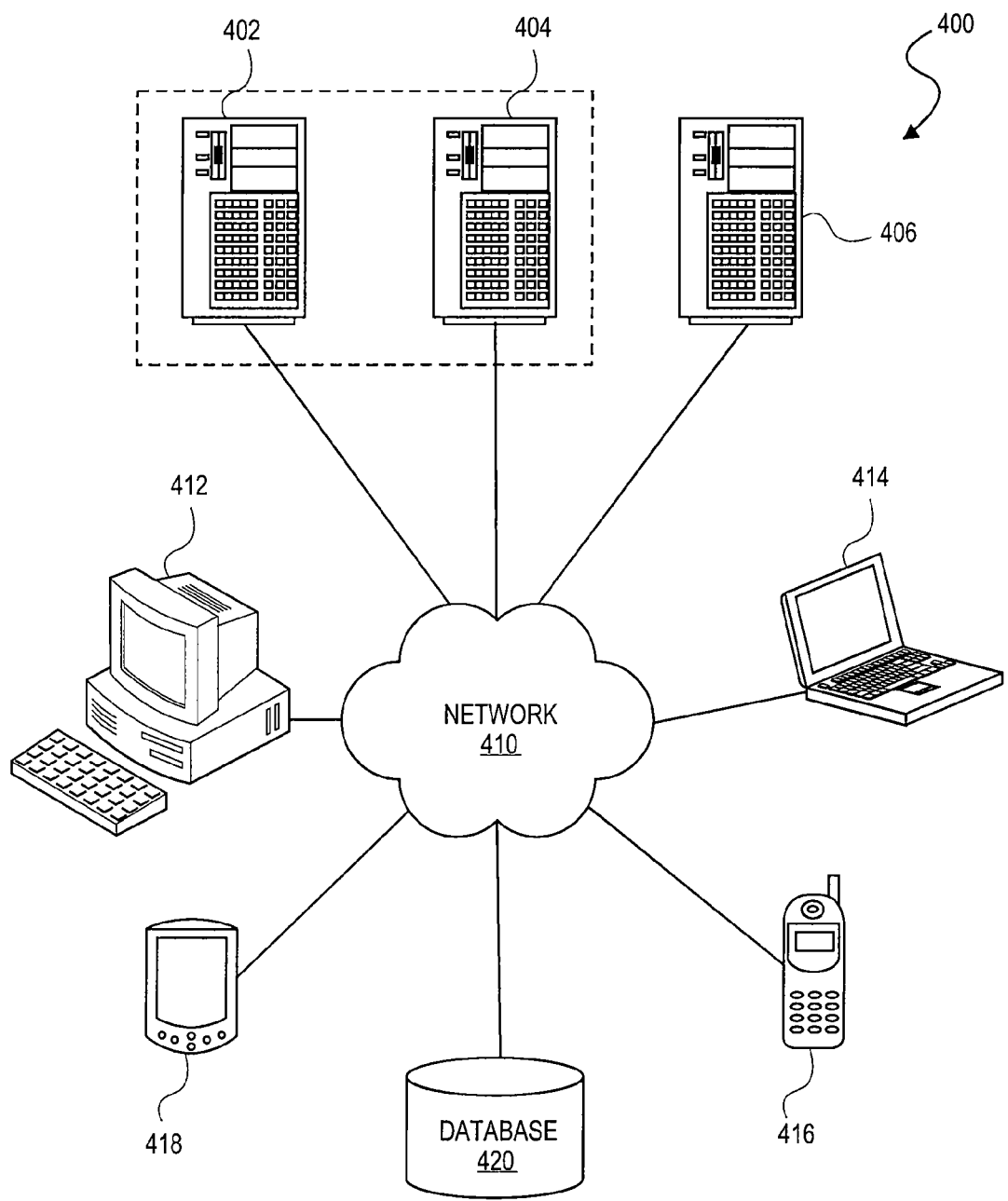
FIG. 4 illustrates components of a computer network that can be used in accordance with one embodiment.

FIG. 4 is a block diagram illustrating components of an exemplary operating environment in which various embodiments of the present invention may be implemented. The system 400 can include one or more user computers, computing devices, or processing devices 412, 414, 416, 418, which can be used to operate a client, such as a dedicated application, web browser, etc. The user computers 412, 414, 416, 418 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 412, 414, 416, 418 may also have any of a variety of applications, including one or more development systems, database client and/or server applications, and Web browser applications. Alternatively, the user computers 412, 414, 416, 418 may be any other electronic device, such as a thin-client computer, Internet-enabled gaming system, and/or personal messaging device, capable of communicating via a network (e.g., the network 410 described below) and/or displaying and navigating Web pages or other types of electronic documents. Although the exemplary system 400 is shown with four user computers, any number of user computers may be supported.

In most embodiments, the system 400 includes some type of network 410. The network may can be any type of network familiar to those skilled in the art that can support data communications using any of a variety of commercially-available protocols, including without limitation TCP/IP, SNA, IPX, AppleTalk, and the like. Merely by way of example, the network 410 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 402, 404, 406 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 406) may be dedicated to running applications, such as a business application, a Web server, application server, etc. Such servers may be used to process requests from user computers 412, 414, 416, 418. The applications can also include any number of applications for controlling access to resources of the servers 402, 404, 406.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 412, 414, 416, 418. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 412, 414, 416, 418.

The system 400 may also include one or more databases 420. The database(s) 420 may reside in a variety of locations. By way of example, a database 420 may reside on a storage medium local to (and/or resident in) one or more of the computers 402, 404, 406, 412, 414, 416, 418. Alternatively, it may be remote from any or all of the computers 402, 404, 406, 412, 414, 416, 418, and/or in communication (e.g., via the network 410) with one or more of these. In a particular set of embodiments, the database 420 may reside in a storage-area network ("SAN") familiar to those skilled in the art. Similarly, any necessary files for performing the functions attributed to the computers 402, 404, 406, 412, 414, 416, 418 may be stored locally on the respective computer and/or remotely, as appropriate. In one set of embodiments, the database 420 may be a relational database, such as Oracle 10 g, that is adapted to store, update, and retrieve data in response to SQL-formatted commands.

Figure 5:
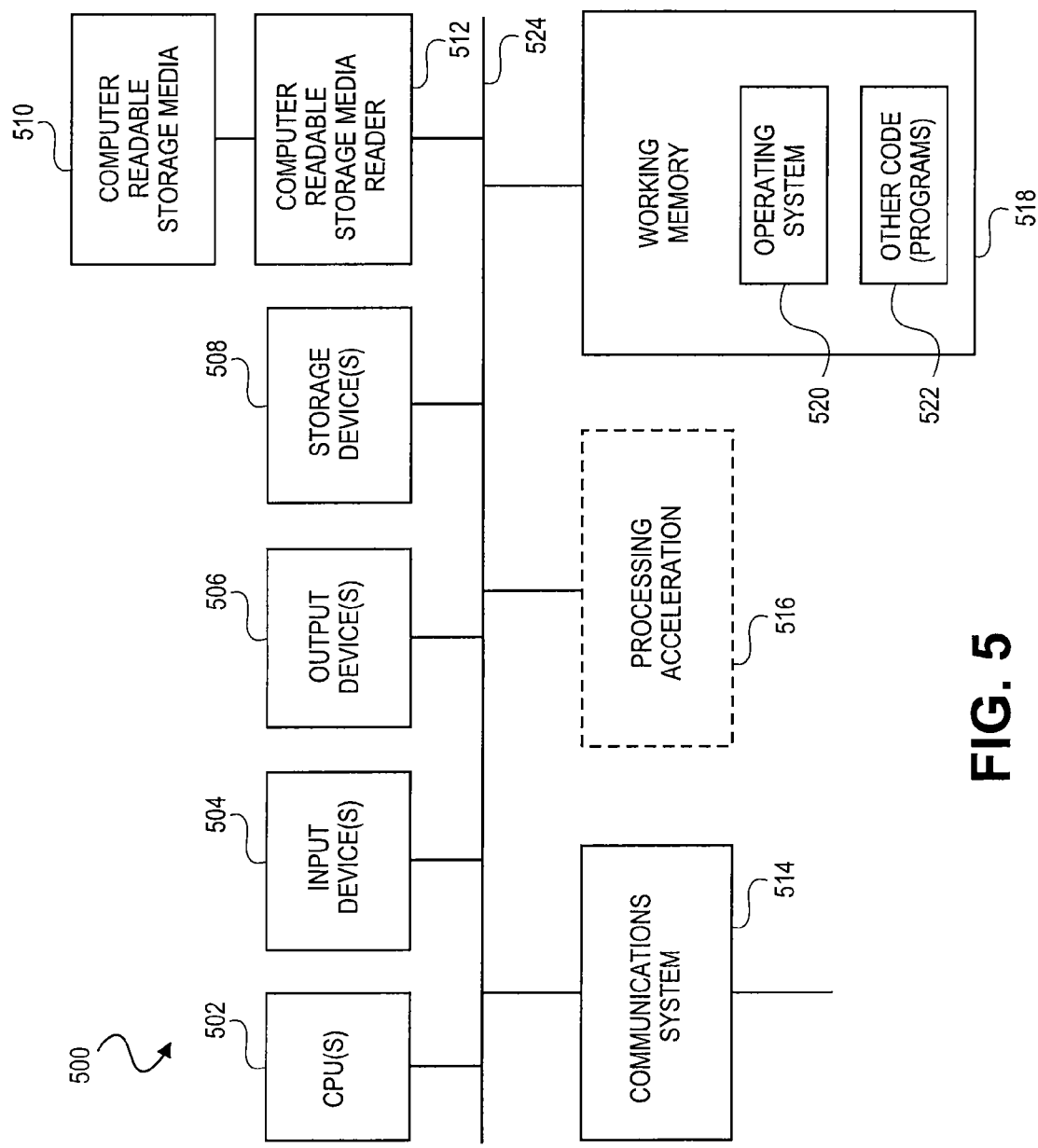
FIG. 5 illustrates components of a computerized device that can be used in accordance with one embodiment.

FIG. 5 illustrates an exemplary computer system 500, in which various embodiments of the present invention may be implemented. The system 500 may be used to implement any of the computer systems described above. The computer system 500 is shown comprising hardware elements that may be electrically coupled via a bus 524. The hardware elements may include one or more central processing units (CPUs) 502, one or more input devices 504 (e.g., a mouse, a keyboard, etc.), and one or more output devices 506 (e.g., a display device, a printer, etc.). The computer system 500 may also include one or more storage devices 508. By way of example, the storage device(s) 508 can include devices such as disk drives, optical storage devices, solid-state storage device such as a random access memory ("RAM") and/or a read-only memory ("ROM"), which can be programmable, flash-updateable and/or the like.

The computer system 500 may additionally include a computer-readable storage media reader 512, a communications system 514 (e.g., a modem, a network card (wireless or wired), an infra-red communication device, etc.), and working memory 518, which may include RAM and ROM devices as described above. In some embodiments, the computer system 500 may also include a processing acceleration unit 516, which can include a digital signal processor DSP, a special-purpose processor, and/or the like.

The computer-readable storage media reader 512 can further be connected to a computer-readable storage medium 510, together (and, optionally, in combination with storage device(s) 508) comprehensively representing remote, local, fixed, and/or removable storage devices plus storage media for temporarily and/or more permanently containing, storing, transmitting, and retrieving computer-readable information. The communications system 514 may permit data to be exchanged with the network and/or any other computer described above with respect to the system 500.

The computer system 500 may also comprise software elements, shown as being currently located within a working memory 518, including an operating system 520 and/or other code 522, such as an application program (which may be a client application, Web browser, mid-tier application, RDBMS, etc.). It should be appreciated that alternate embodiments of a computer system 500 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

What is claimed is:

1. A method of providing an expanded view of data records associated with enterprise software, the method comprising:

receiving, at one or more computer systems, a plurality of the data records associated with the enterprise software;

generating, with one or more processor associated with the one or more computer systems, a user interface of the enterprise software that includes a first widget having a viewable extent of all the data records associated with the enterprise software, a displayed portion of the viewable extent of the first widget being initially available in a viewable region of a first window of a web browser and having a grid representation of the plurality of data records, viewability of a remainder of the viewable extent of the first widget being limited by design to a set of interactions with the first widget and to accommodate other widgets of the user interface;

in response a user interacting via the user interface of the enterprise software with the first widget, generating, with the one or more processors associated with the one or more computer systems, a second window modal to the web browser that includes a second widget having the same viewable extent as the first widget of all the data records associated with the enterprise software, a displayed portion of the viewable extent of the second widget being initially the same as the displayed portion of the viewable extent of the first widget and having a grid representation of any of the plurality of data records within the displayed portion of the first widget, a remainder of the viewable extent of the second widget being available in response to a set of interactions with the second window that includes at least one of a size, position, and view of the second window and that is different from the set of interactions with the first widget;

confining, with the one or more processors associated with the one or more computer systems, the second window to the viewable region of the first window and overlying at least some of the displayed portion of the viewable extent of the first widget, wherein confining the second window prevents user interaction with the web browser that is outside of the second window until the second window is closed;

receiving, at the one or more computer systems, an edit to a data record associated with the enterprise software made via the second widget; and updating, with the one or more processors associated with the one or more computer systems, the viewable extent of the first widget in response to a close event associated with the second window to reflect the edit to the data record associated with the enterprise software made via the second widget.

2. The method of claim 1, wherein generating the first widget or the second widget comprises generating the first or second widget to include at least one of a table or a spreadsheet as their respective grid representation.

3. The method of claim 1, wherein one or more of the other widgets of the user interface each have a user interface element enabling a user to open a modal window for the widget.

4. The method of claim 1, further comprising:

storing the edited data record to a storage device in response to the user editing the data record in the second window.

5. The method of claim 1, wherein the viewability of the remainder of the viewable extend of the first widget is limited by design to scrollbars.

6. The method of claim 1, further comprising:

hiding the first portion of the viewable extent of the first widget upon opening the second window.

7. The method of claim 1, further comprising:
graying text or a button on the web page upon opening the second window.

8. A computer program product including program instructions embodied on a non-transitory tangible computer-readable medium for providing an expanded view of data associated with an enterprise software application, execution of the program instructions resulting in operations comprising:
receiving a portion of the data associated with the enterprise software application, the portion of the data associated with the enterprise software application having a plurality of data records;
generating a user interface of the enterprise software application within a first web browser window that includes a first widget having a viewable extent of all data records associated with the enterprise software application, a displayed portion of the viewable extent of the first widget being initially available in a viewable region of the first web browser window and having a grid representation of the plurality of data records, viewability of a remainder of the viewable extent of the first widget being limited by design to a set of interactions with the first widget and to accommodate other widgets of the user interface;
in response to a user interacting via the user interface of the enterprise software application with the first widget, generating a second web browser window modal to the first web browser window that includes a second widget having the same viewable extent as the first widget of all the data records associated with the enterprise software application, a displayed portion of the viewable extent of the second widget being initially the same as the displayed portion of the viewable extent of the first widget and having a grid representation of any of the plurality of data records within the displayed portion of the first widget, a remainder of the viewable extent of the second widget being available in response to a set of interactions with the second web browser window that includes at least one of a size, position, and view of the second web browser window and that is different from the set of interactions with the first widget;
confining the second web browser window to the viewable region of the web browser window and overlying at least some of the displayed portion of the viewable extent of the first widget, wherein confining the second web browser window prevents user interaction with a web browser that is outside of the second window until the second window is closed;
receiving an edit to a portion of the data associated with the enterprise software application made via the second widget; and
updating, with the one or more processors associated with the one or more computer systems, the viewable extent of the first widget in response to a close event associated with the second web browser window to reflect the edit to the portion of the data associated with the enterprise software application made via the second widget.

9. The computer program product of claim 8, wherein generating the first widget or the second widget comprises generating the first or second widget to include at least one of a table or a spreadsheet as their respective grid representation.

10. The computer program product of claim 8, wherein one or more of the other widgets of the user interface each have a user interface element enabling a user to open a modal window for the widget.

11. The computer program product of claim 8, wherein execution of the program instructions results in operations further comprising:
storing the edited portion of the data to a storage device in response to the user editing the the portion of the data in the second web browser window.

12. A system for providing an expanded view of data associated with an enterprise software, the system comprising:
a processor; and
a memory device including instructions that, when executed by the processor, cause the processor to:
receive a plurality of the data records associated with the enterprise software;
generate a user interface of the enterprise software that includes a first widget having a viewable extent of all the data records associated with the enterprise software, a displayed portion of the viewable extent of the first widget being initially available in a viewable region of a first window of a web browser and having a grid representation of the plurality of data records, viewability of a remainder of the viewable extent of the first widget being limited by design to a set of interactions with the first widget and to accommodate other widgets of the user interface;
in response to a user interacting via the user interface of the enterprise software application, generate a second window modal to the web browser that includes a second widget having the same viewable extent as the first widget of all the data records associated with the enterprise software, a displayed portion of the viewable extent of the second widget being initially the same as the displayed portion of the viewable extent of the first widget and having a grid representation of any of the plurality of data records within the displayed portion of the first widget, a remainder of the viewable extent of the second widget being available in response to a set of interactions with the second window that includes at least one of a size, position, and view of the second window and that is different from the set of interactions with the first widget;
confine the second window to the viewable region of the first window and overlying at least some of the displayed portion of the viewable extent of the first widget, wherein confining the second window prevents user interaction with the web browser that is outside of the second window until the second window is closed;
receive an edit to a data record associated with the enterprise software made via the second widget; and
update the viewable extent of the first widget in response to a close event associated with the second window to reflect the edit to the data record associated with the enterprise software made via the second widget.

13. The system of claim 12, wherein to generate the first widget or the second widget the instructions cause the processor to generate the first or second widget to include at least one of a table or a spreadsheet as their respective grid representation.

14. The system of claim 12, wherein the memory device further includes instructions that, when executed by the processor, cause the processor to:
store the edited data record to a storage device in response to the user editing the data record in the second window.

* * * * *

UNITED STATES PATENT AND TRADEMARK OFFICE
CERTIFICATE OF CORRECTION

| | | |
|---|---|---|
| PATENT NO. | : 9,081,471 B2 | |
| APPLICATION NO. | : 12/233927 | |
| DATED | : July 14, 2015 | |
| INVENTOR(S) | : Eamon Gaffney et al. | |

It is certified that error appears in the above-identified patent and that said Letters Patent is hereby corrected as shown below:

In the Specification

Column 5, Line 40: Delete "modal modal" and insert --modal--

In the Claims

Claim 11, Column 12, Line 5: Delete "editing the the" and insert --editing the--

Signed and Sealed this
Seventeenth Day of May, 2016

Michelle K. Lee
*Director of the United States Patent and Trademark Office*